June 21, 1960 D. E. WRIGHT 2,942,175

CASCADED MAGNETIC AMPLIFIER

Filed Nov. 8, 1954

INVENTOR.
DALE E. WRIGHT
BY
Knox & Knox

United States Patent Office 2,942,175
Patented June 21, 1960

2,942,175

CASCADED MAGNETIC AMPLIFIER

Dale E. Wright, San Diego, Calif.; Sherman Lacy, administrator of the estate of said Dale E. Wright, deceased, assignor to The Ryan Aeronautical Co., San Diego, Calif.

Filed Nov. 8, 1954, Ser. No. 467,568

1 Claim. (Cl. 323—89)

The present invention relates generally to amplifiers and more particularly to a cascaded magnetic amplifier.

Magnetic amplifiers are used in applications requiring fast response and high gain, and several stages are often cascaded to increase the gain, the amplified signal from one stage being used to drive a following stage for further amplification. The usual method of cascading is to utilize the output of one stage to reset or saturate the magnetic core of the next stage. In many types of half-wave magnetic amplifiers each stage comprises a pair of magnetic cores arranged in a bridge circuit, an output being obtained by unbalancing the bridge. Although the bridge type circuit has the advantage of reversible polarity, there are also disadvantages to the arrangement: the output is a sharp pulse of current to which the following stage does not respond efficiently; also, a heavy drain is placed on the supply voltage after the magnetic cores have saturated. Further, two magnetic cores are necessary for each stage. These and other characteristics of magnetic amplifiers are well known to those skilled in the art and need not be elaborated on for this disclosure.

The present magnetic amplifier circuit uses a single magnetic core for each stage, and each stage is a simple half-wave circuit in which the core saturates on one half-cycle of the supply voltage and resets on the other half-cycle. The response time of the circuit is thus one half-cycle for each stage of the amplifier and is dependent only on the frequency of the supply voltage.

The primary object of this invention is to provide a cascaded magnetic amplifier in which the output current of the first stage does not flow in the control circuit of the following stage.

Another object of this invention is to provide a cascaded magnetic amplifier which requires only a single magnetic core for each stage.

Another object of this invention is to provide a cascaded magnetic amplifier in which the response time is determined by the frequency of the supply voltage and the number of stages used in the amplifier.

With these and other objects definitely in view, this invention consists in the novel construction, combination and arrangement of elements and portions, as will be hereinafter fully described in the specification, particularly pointed out in the claim, and illustrated in the drawing which forms a material part of this disclosure and wherein similar characters of reference indicate similar or identical elements and portions throughout the specification and throughout the views of the drawing, and in which:

Figures 1, 2, 3:
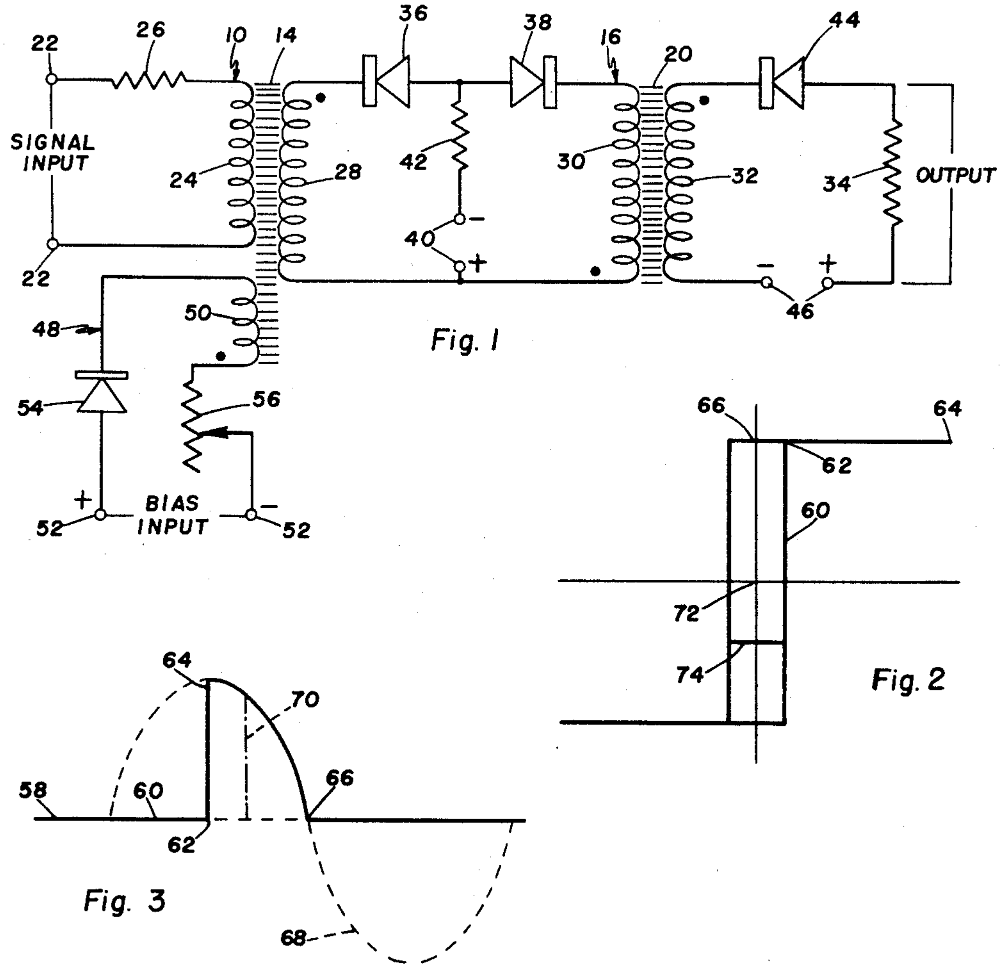
Fig. 1 is a wiring diagram of the magnetic amplifier showing two stages of amplification.
Fig. 2 is a diagram of the rectangular hysteresis loop desirable in the amplifier.
Fig. 3 is a voltage wave form diagram showing the output of the amplifier.

Referring now to Fig. 1 of the drawing, the amplifier comprises a first stage 10 having a single saturable core

14, said first stage being connected to a second stage 16 having a single saturable core 20. Two stages only are shown for simplicity although any number of stages may be used to obtain the desired amplification by cascading.

The first stage 10 includes input terminals 22 connected to a source of alternating or direct current, and supplying that current to the first stage control winding 24 through a suitable input resistor 26. The control winding 24 is, of course, wound on the core 14 together with a first stage load winding 28. This load winding 28 is connected to the second stage control winding 30 wound on the core 20, together with the second stage load winding 32. The second stage load winding 32 is a part of the output circuit of the amplifier, an output load resistor 34 being indicated to complete the circuit. Intermediate the first stage load winding 28 and second stage control winding 30 are a pair of rectifiers 36 and 38 of similar polarity; i.e. both rectifiers conduct on the same half-cycle of the supply voltage. Applied to the first stage load winding 28 and the second stage control winding 30 through a current limiting resistor 42 and the rectifiers 36 and 38 respectively, is an intermediate supply and re-setting voltage. This voltage, which is supplied to terminals 40, provides the load voltage for the first stage and the re-setting voltage for the second stage.

Connected to the second stage load winding 32 is a further rectifier 44 of opposite polarity to the rectifier 38, the circuit continuing through the output load resistor 34 to a pair of final input terminals 46, through which the load voltage is applied to the second stage load winding. The instantaneous polarity at the final input terminals 46 and at the intermediate input terminals 40 is indicated by plus and minus signs.

The initial stage of the amplifier is also provided with a bias circuit which includes a bias winding 50 wound on the core 14 and connected to an independent source of voltage through bias input terminals 52. This bias circuit 48 also includes a rectifier 54 and a variable resistor 56 which provides an adjustment of the bias. The instantaneous polarity of this bias voltage is such that rectifier 54 conducts while rectifier 36 opposes conduction.

Basically, each stage of the amplifier is a simple half-wave circuit in which the core saturates or fires during one half-cycle of the supply voltage and resets on the next half-cycle. The voltage wave form of the voltage that exists across resistor 34 is shown diagrammatically in Fig. 3, in which zero voltage is represented by the base line 58. The sine wave of the alternating current input is indicated in dash line while the actual output is shown in full line.

It will be seen that essentially zero current flows in the output load resistor 34 during the first quarter-cycle of the sine wave, as indicated at 60, this condition prevailing until the core 20 becomes saturated at the point indicated at 62. When the core 20 is fully saturated the output voltage rises to a peak as at 64, the actual value being dependent on the input voltage, and then returns to zero at point 66 as the first half-cycle of voltage is completed. During the second half-cycle of voltage indicated at 68, the core is reset as will be hereinafter explained.

For efficient operation of the magnetic amplifier it is desirable that the saturable cores exhibit hysteresis loops which are substantially rectangular, as shown diagrammatically in Fig. 2. The hysteresis loops, if not rectangular, must have a ratio of residual induction to peak induction that is approximately unity. Parts of the hysteresis loop have been enumerated to indicate the portions corresponding to the various portions of the voltage wave form shown in Fig. 3. The structure and magnetic properties of such saturable cores are well known to those skilled in the art.

The operation of the amplifier itself is as follows:

During the half-cycle of supply voltage with instantaneous polarities as indicated in Fig. 1, rectifier 38 will oppose conduction while rectifier 44 will allow conduction, which will cause core 20 to saturate. On the alternate half-cycle, rectifier 54 will oppose conduction while rectifier 36 will allow conduction, which will cause core 14 to saturate. These periods of time will be referred to hereafter as the load half-cycles of the second and first stages respectively.

During the half-cycle of supply voltage with instantaneous polarities opposite to those shown in Fig. 1, rectifier 44 will oppose conduction while rectifier 38 will allow conduction, causing core 20 to reset from the saturation point 66 of Fig. 2, down the left hand side of the hysteresis loop to some final point 72 in that figure. On the alternate half-cycle, rectifier 36 will oppose conduction while rectifier 54 will allow conduction, causing core 14 to reset from saturation point 66 to a final point 72 on the hysteresis loop. These periods of time will be referred to hereinafter as the resetting half-cycles of the second and first stages respectively. It will be noted that the various rectifiers are so connected and phased that each core resets during one half-cycle and saturates during the following half-cycle. It will also be noted that the various rectifiers and supply voltages are so connected and phased that the first stage is resetting while the second stage is saturating, and that the first stage is saturating while the second stage is resetting.

The resetting voltage that is applied to a core, either by means of the bias winding 50 or a control winding, or both, determines the point in the load half-cycle at which the core will saturate.

With zero signal input at terminals 22, the bias of the first stage 10 is adjusted by means of the resistor 56, so that the voltage at terminals 52 will reset core 14 to the point 72, as in Fig. 2. As the following half-cycle begins, the voltage at terminals 40 causes core 14 to approach saturation indicated by point 62. As soon as this core 14 is fully saturated at point 62, current flows in the first stage load winding 28 and through the current limiting resistor 42 and, by this firing, effectively short circuits the second stage control winding 30. During the time the first stage 10 is approaching saturation, the second stage 16 is being reset by the same voltage at terminals 40. However, with the firing of the first stage core 14, the reset action of core 20 is halted. Thus the first stage firing controls the reset of the second stage. As the next half-cycle begins, the second stage core 20 approaches saturation and, after reaching saturation at point 62, the remainder of the voltage, from points 62 to 66 of Fig. 3, is applied across the load resistor 34.

When a signal is applied at terminals 22 to the first stage control winding 24, it will either aid or oppose the bias voltage applied at terminals 52. If, for example, the signal voltage is of such phase or polarity that it aids the bias voltage, the first stage 10 will be reset below point 72 of Fig. 2 to some new point 74. On the following half-cycle, when core 14 is saturating, the core will absorb more voltage before saturating so that the firing occurs slightly later in the cycle, as indicated by the dot-dash line 70 in Fig. 3. This causes more reset on the second stage core 20 which, in turn, causes a slight delay in the firing time of the second stage. This results in a decrease in the average voltage applied to the load resistor 34. Conversely, an input signal at terminals 22 that opposes the first stage bias voltage causes the stages to fire earlier in the cycle, with a resultant increase in the average voltage applied to the load resistor 34.

Any variation in the input will thus obviously result in a corresponding variation in the average output voltage.

To ensure efficient and satisfactory operation of the amplifier the correct relative values of certain components must be maintained. For example, the ratio of turns of the second stage control winding 30 to the turns of the second stage load winding 32 must be equal to the ratio of the supply voltage at terminals 40 to the supply voltage at terminals 46. While this is true from a theoretical analysis of this method of cascading, it will be found in practice that the above-mentioned ratios are only approximately equal. This discrepancy between theoretical and practical results can be attributed to the fact that the rectifiers used in a practical circuit cannot be perfect, i.e. zero forward resistance and infinite backward resistance. To further ensure efficient and satisfactory operation of the amplifier, the current limiting resistor 42 must be of a large value compared to the resistance of the first stage load winding 28 so that, when the core 14 is saturated, the second stage control winding 30 will be sufficiently short circuited. However, the value of this resistor 42 must not be so great that it causes an excesive voltage drop due to the magnetizing current of the second stage control winding 30.

Obviously the number of turns of the various windings must be designed with consideration given to the core material, core size, voltage to be absorbed and other factors. Since this design procedure is well known to those skilled in the art, the details need not be elaborated on in this disclosure.

From the foregoing description it will be evident that the response time of the amplifier is one half-cycle of the input frequency for each stage of the amplifier. An additional one half-cycle lag may occur if the signal voltage is applied during the first stage load half-cycle. Thus the maximum response time of the amplifier may be calculated basically from the formula:

$$T=\frac{N+1}{2}\times\frac{1}{F}$$

where T is the maximum response time in seconds, N is the number of amplifier stages and F is the supply frequency in cycles per second.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the forms of the invention disclosed herein may be made without departure from the spirit and scope of the invention, and that the specification and drawing are to be considered as merely illustrative rather than limiting.

I claim:

A magnetic amplifier comprising an A.C. power source; a first stage saturable reactor having an input and an output; bias means connected to an independent source of voltage and coupled to said reactor to control the quiescent output current level; a second stage saturable reactor having an input and an output; said first stage output and said second stage input having common leads, one common lead being connected to one side of said A.C. power source; current limiting means connected between the other side of said A.C. power source and the second common lead; unidirectional conductors in one of said leads and on either side of said current limiting means; said unidirectional conductors being of similar polarity with respect to the A.C. power source; and said bias means being polarized in opposition to the first stage output and being independent of the output of the amplifier and being adjustable; the second stage input constituting a control and biasing means for the second stage reactor.

References Cited in the file of this patent

UNITED STATES PATENTS

| | | |
|---|---|---|
| 2,636,150 | McKenney et al. | Apr. 21, 1953 |
| 2,770,737 | Ramey | Nov. 13, 1956 |

FOREIGN PATENTS

| | | |
|---|---|---|
| 656,120 | Great Britain | Aug. 15, 1951 |
| 699,542 | Great Britain | Nov. 11, 1953 |

OTHER REFERENCES

W. A. Geyger: "Magnetic Amplifier Circuits" pp. 157, 158, January 29, 1954, McGraw-Hill Book Company Inc. (Fig. 10.76).